(12) United States Patent
Sherman et al.

(10) Patent No.: US 8,517,255 B2
(45) Date of Patent: Aug. 27, 2013

(54) AUTOMATED APPLIANCE REGISTRATION

(75) Inventors: Itay Sherman, Hod Hasharon (IL); Eyal Bychkov, Hod Hasharon (IL); Uri Ron, Kfar Saba (IL); Hagay Katz, Moshav Herut (IL); Hagit Perry, Herzilya (IL); Ran Margalit, Ramat Hasharon (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/612,890

(22) Filed: Sep. 13, 2012

(65) Prior Publication Data

US 2013/0045776 A1  Feb. 21, 2013

Related U.S. Application Data

(62) Division of application No. 13/347,125, filed on Jan. 10, 2012, now Pat. No. 8,342,394, which is a division of application No. 12/237,394, filed on Sep. 25, 2008, now Pat. No. 8,091,772.

(60) Provisional application No. 60/995,575, filed on Sep. 26, 2007, provisional application No. 61/062,171, filed on Jan. 23, 2008, provisional application No. 61/063,668, filed on Feb. 5, 2008, provisional application No. 61/080,264, filed on Jul. 13, 2008.

(30) Foreign Application Priority Data

Feb. 6, 2008  (WO) ................ PCT/IL2008/000164

(51) Int. Cl.
*G06F 17/00* (2006.01)

(52) U.S. Cl.
USPC ........................................ 235/375

(58) Field of Classification Search
USPC .......................................... 235/375
See application file for complete search history.

(56) References Cited

U.S. PATENT DOCUMENTS

| | | |
|---|---|---|
| 4,977,394 A | 12/1990 | Manson et al. |
| 5,625,673 A | 4/1997 | Grewe et al. |
| 5,628,055 A | 5/1997 | Stein |
| 5,809,115 A | 9/1998 | Inkinen |
| 5,875,430 A | 2/1999 | Koether |
| 5,893,037 A | 4/1999 | Reele et al. |
| 5,907,815 A | 5/1999 | Grimm et al. |
| 6,163,693 A | 12/2000 | Rydbeck |
| 6,188,917 B1 | 2/2001 | Laureanti |
| 6,201,867 B1 | 3/2001 | Koike |
| 6,208,853 B1 | 3/2001 | LoVasco et al. |
| 6,243,578 B1 | 6/2001 | Koike |
| 6,477,357 B1 | 11/2002 | Cook |

(Continued)

FOREIGN PATENT DOCUMENTS

| | | |
|---|---|---|
| EP | 1871075 A1 | 12/2007 |
| WO | 9421058 A1 | 9/1994 |

(Continued)

*Primary Examiner* — Christle Marshall
(74) *Attorney, Agent, or Firm* — Soquel Group LLC

(57) ABSTRACT

A method for registering an appliance with a service provider, including receiving, by a server computer, a message from a cellular telephone, the message including a unique ID for an appliance, wherein the server computer stores billing information associated with the cellular telephone, wherein the appliance includes a modem, wherein the cellular telephone is separate from the appliance, and wherein the server computer is separate from the appliance and separate from the cellular telephone, further receiving, by the server computer, registration information from the appliance via the modem of the appliance, and associating, by the server computer, the billing information associated with the cellular telephone, with the appliance.

5 Claims, 9 Drawing Sheets

(56) References Cited

U.S. PATENT DOCUMENTS

| | | |
|---|---|---|
| 6,502,411 B2 | 1/2003 | Okamoto |
| 6,516,202 B1 | 2/2003 | Hawkins et al. |
| 6,553,774 B1 | 4/2003 | Ishio et al. |
| 6,587,879 B1 | 7/2003 | Reynolds |
| 6,640,113 B1 | 10/2003 | Shim et al. |
| 6,690,947 B1 | 2/2004 | Tom |
| 6,745,011 B1 | 6/2004 | Hendrickson et al. |
| 6,826,267 B2 | 11/2004 | Daum et al. |
| 6,853,291 B1 | 2/2005 | Aisa |
| 6,892,546 B2 | 5/2005 | Singh et al. |
| 6,898,283 B2 | 5/2005 | Wycherley et al. |
| 6,907,264 B1 | 6/2005 | Sterkel |
| 6,999,792 B2 | 2/2006 | Warren |
| 7,085,542 B2 | 8/2006 | Dietrich et al. |
| 7,194,285 B2 | 3/2007 | Tom |
| 7,266,391 B2 | 9/2007 | Warren |
| 2002/0007237 A1 | 1/2002 | Phung et al. |
| 2002/0090980 A1 | 7/2002 | Wilcox et al. |
| 2002/0151327 A1 | 10/2002 | Levitt |
| 2002/0184385 A1 | 12/2002 | Kato |
| 2003/0009710 A1 | 1/2003 | Grant |
| 2003/0046377 A1 | 3/2003 | Daum et al. |
| 2003/0069750 A1 | 4/2003 | Siegel et al. |
| 2003/0074179 A1 | 4/2003 | Ropo et al. |
| 2004/0233930 A1 | 11/2004 | Colby, Jr. |
| 2004/0236843 A1 | 11/2004 | Wing et al. |
| 2004/0268005 A1 | 12/2004 | Dickie |
| 2005/0070225 A1 | 3/2005 | Lee |
| 2005/0075938 A1 | 4/2005 | Mukai et al. |
| 2005/0159184 A1 | 7/2005 | Kerner et al. |
| 2006/0003804 A1 | 1/2006 | Liu |
| 2006/0105722 A1 | 5/2006 | Kumar |
| 2006/0195551 A1 | 8/2006 | Dowling |
| 2006/0227517 A1 | 10/2006 | Zayas et al. |
| 2006/0241353 A1 | 10/2006 | Makino et al. |
| 2007/0004450 A1 | 1/2007 | Parikh |
| 2007/0018957 A1 | 1/2007 | Seo |
| 2007/0079030 A1 | 4/2007 | Okuley et al. |
| 2007/0161404 A1 | 7/2007 | Yasujima et al. |
| 2007/0288583 A1 | 12/2007 | Rensin et al. |
| 2008/0009325 A1 | 1/2008 | Zinn et al. |
| 2008/0026794 A1 | 1/2008 | Warren |
| 2008/0040354 A1 | 2/2008 | Ray et al. |
| 2008/0140886 A1 | 6/2008 | Izutsu |
| 2008/0238653 A1 | 10/2008 | Unger |
| 2010/0093401 A1 | 4/2010 | Moran et al. |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |

AUTOMATED APPLIANCE REGISTRATION

PRIORITY REFERENCE TO RELATED APPLICATIONS

This application is a divisional of U.S. Ser. No. 13/347,125, entitled AUTOMATED APPLIANCE REGISTRATION, filed on Jan. 10, 2012 now U.S. Pat. No. 8,342,394 by inventors Itay Sherman, Eyal Bychkov, Uri Ron, Hagay Katz, Hagit Perry and Ran Margalit, which is a divisional of U.S. Ser. No. 12/237,394, now U.S. Pat. No. 8,091,7729, entitled AUTOMATED APPLIANCE REGISTRATION, filed on Sep. 25, 2008 by inventors Itay Sherman, Eyal Bychkov, Uri Ron, Hagay Katz, Hagit Perry and Ran Margalit. U.S. Ser. No. 12/237,394 claims benefit of U.S. Provisional Application No. 60/995,575, entitled AUTOMATED CONSUMER ELECTRONICS DEVICE REPORTING, filed on Sep. 26, 2007 by inventors Itay Sherman, Eyal Bychkov, Uri Ron, Hagay Katz and Hagit Perry. U.S. Ser. No. 12/237,394 also claims benefit of U.S. Provisional Application No. 61/062,171, entitled MODULAR WIRELESS COMMUNICATOR, filed on Jan. 23, 2008 by inventors Itay Sherman, Eyal Bychkov, Itay Cohen, Tami Demri, Hagay Katz, Eran Miller, Hagit Perry, Uri Ron and Yaron Segalov. U.S. Ser. No. 12/237,394 also claims benefit of U.S. Provisional Application No. 61/063,668, entitled MODULAR WIRELESS COMMUNICATOR, filed on Feb. 5, 2008 by inventors Dov Moran, Itay Sherman, Eyal Bychkov, Itay Cohen, Yaron Segalov, Tami Demri, Eran Miller, Uri Ron, Hagay Katz and Hagit Perry. U.S. Ser. No. 12/237,394 also claims benefit of U.S. Provisional Application No. 61/080,264, entitled AUTOMATED CONSUMER ELECTRONICS DEVICE REPORTING, filed on Jul. 13, 2008 by inventors Itay Sherman, Eyal Bychkov, Uri Ron, Hagay Katz and Hagit Perry. U.S. Ser. No. 12/237,394 also claims foreign priority from PCT Application No. PCT/IL2008/000164, entitled MODULAR WIRELESS COMMUNICATOR, filed on Feb. 6, 2008 by inventors Dov Moran, Itay Sherman, Eyal Bychkov, Itay Cohen, Yaron Segalov, Tamir Demri, Eran Miller, Uri Ron, Tal Engelstein, Hagay Katz and Hagit Perry.

FIELD OF THE INVENTION

The field of the present invention is wireless communication applied to automated registration of appliances.

BACKGROUND OF THE INVENTION

Consumers who buy new electrical appliances generally contact the manufacturer or seller after purchase of the appliance, in order to register the appliance and thereby obtain a warranty. The warranty holds the manufacturer or seller responsible for defects in the appliance.

Currently registration is performed manually. Specifically, to register a new appliance a consumer generally needs to fill out registration forms and send them to the manufacturer or seller, either via regular postal service or electronically via the Internet. Registration includes information about the appliance and information about the owner of the appliance. Information about the appliance includes a serial number, a model number, a point of purchase and a date of purchase. Information about the owner includes name and contact details.

Registration of an appliance may be time consuming or cumbersome and, as a result, many consumers do not properly fill in and submit their registration forms. These consumers often discover, when a problem with the appliance arises, that they do not have valid warranties.

There is thus a need for automated methods and systems for registering new appliances.

SUMMARY OF THE DESCRIPTION

Aspects of the present invention concern automatic registration for electrical appliances. In one embodiment, the present invention employs a communication card that includes a controller, a flash storage memory, a battery, a wireless modem, a power amplifier, and an interface for connecting the card to an appliance. When the communication card is connected to a new appliance, the card automatically collects information about the appliance and its owner, and transmits the collected information to a remote manufacturer or seller for registering the appliance.

There is thus provided in accordance with an embodiment of the present invention a system for automatically registering an appliance, including a storage housed within an electrical appliance for storing identifying information about the electrical appliance and its purchase, and a communication card including a controller, an interface connector for connecting the communication card to the electrical appliance, a wireless cellular modem for transmitting data, and a card memory for storing program code, wherein when the communication card is connected to the electrical appliance via the interface connector, the program code automatically instructs the controller to collect the identifying information about the electrical appliance and its purchase, to collect owner information and to transmit at least a portion of the collected information to at least one remote recipient using the cellular modem.

There is additionally provided in accordance with an embodiment of the present invention a method for automatically registering an appliance, including connecting a communication card to an electrical appliance, wherein identifying information about the electrical appliance and its purchase is stored within a memory in the electrical appliance, automatically collecting (i) the identifying information about the electrical appliance and its purchase from the memory in the electrical appliance, (ii) owner information, and (iii) contact information for at least one remote recipient, by the communication card, automatically opening a connection with the at least one remote recipient, by the communication card, and automatically transmitting at least a portion of the collected information to the at least one remote recipient, by the communication card.

There is further provided in accordance with an embodiment of the present invention a method for registering change of ownership of an appliance, including connecting a first communication card to an electrical appliance, wherein usage information about the electrical appliance is stored within a memory in the electrical appliance, issuing a notification to the electrical appliance, via the communication card, that is ownership is being relinquished, connecting a second communication card to the electrical appliance, wherein information about a new owner is stored within a memory in the second communication card, detecting that the second communication card is connected to the electrical appliance and that the ownership of the electrical appliance is currently relinquished, automatically collecting (i) the usage information about the electrical appliance, and (ii) the information about the new owner, automatically opening a connection with a remote recipient, by the second communication card, and automatically transmitting at least a portion of the collected information to the recipient, by the second communication card.

There is yet further provided in accordance with an embodiment of the present invention a wireless communicator, including an interface configured to enable the wireless communicator to connect to a plurality of different electronic devices, wherein each of the plurality of electronic devices has device information, a memory storing a device registration program, a wireless modem configured to transmit and receive data from time to time when the wireless communicator is connected to one of the plurality of different electronic devices and from time to time when the wireless communicator is not connected to any of the plurality of different electronic devices, and a controller coupled to the interface, the memory and the wireless modem, the controller configured to receive the device information from an electronic device connected to the wireless communicator and to execute the device registration program, wherein the device registration program includes instructions that cause the wireless modem to transmit at least a portion of the device information to a recipient.

There is moreover provided in accordance with an embodiment of the present invention an electronic device, including an interface configured to enable the electronic device to connect to one of a plurality of wireless communicator and to enable data to be transferred between the electronic device and a wireless communicator connected to the electronic device, a memory storing device information, and a controller coupled to the interface and the memory, the controller configured to transfer at least a portion of the device information to a wireless communicator connected to the electronic device for transmission to a recipient.

There is additionally provided in accordance with an embodiment of the present invention a method for registering an appliance with a service provider, including providing an appliance, the appliance having a unique ID associated therewith, and the appliance including a cellular communication modem, providing a cellular telephone, the cellular telephone having a unique phone number associated therewith and having billing information associated therewith, sending a message from the cellular telephone to a designated phone number, the message including the unique appliance ID, registering the appliance over a communication network, and associating the billing information associated with the cellular telephone, with the appliance.

There is further provided in accordance with an embodiment of the present invention a method for registering an appliance with a service provider, including providing an appliance, the appliance having a unique ID associated therewith, and the appliance including a cellular communication modem and a Bluetooth modem, providing a cellular telephone, the cellular telephone having a unique phone number associated therewith and having billing information associated therewith, and the cellular telephone including a Bluetooth modem, moving the appliance in proximity to the cellular telephone, initiating a Bluetooth connection from the appliance's Bluetooth modem to the cellular telephone's Bluetooth modem, approving the initiated Bluetooth connection to the cellular telephone, dialing from the cellular telephone to a designated destination, transmitting the device ID to the designated destination, and associating the billing information associated with the cellular telephone, with the appliance.

There is yet further provided in accordance with an embodiment of the present invention a method for registering an appliance with a service provider, including providing an appliance, the appliance having a unique ID associated therewith, and the appliance including a detachable SD module, the SD module including a pre-set SMS message containing the unique ID, providing a cellular telephone, the cellular telephone having a unique phone number associated therewith and having billing information associated therewith, detaching the SD module from the appliance, inserting the SD module into the cellular telephone, copying the SMS message from the SD module into the cellular telephone, sending the SMS message from the cellular telephone to a designated destination, and associating the billing information associated with the cellular telephone, with the appliance.

There is moreover provided in accordance with an embodiment of the present invention a method for registering electronic devices with service providers, including providing a database table of appliances and unique IDs thereof, providing a database table of cellular telephone numbers and associated billing information, receiving a cellular telephone number and a unique appliance ID, and associating the billing information associated with the cellular telephone, with the appliance, by joining the database table of appliances with the database table of cellular telephone numbers.

There is additionally provided in accordance with an embodiment of the present invention a system for automatically registering an appliance, including a storage housed within an electrical appliance for storing identifying information about the electrical appliance and its purchase, and a communication card including a controller, an interface connector for connecting the communication card to the electrical appliance, a wireless cellular modem for transmitting data, and a card memory for storing program code, wherein when the communication card is connected to the electrical appliance via the interface connector, the program code automatically instructs the controller to collect the identifying information about the electrical appliance and its purchase, to collect owner information, and to open a TCP connection to a server computer and to transmit at least a portion of the collected information to the server computer using the cellular modem.

There is further provided in accordance with an embodiment of the present invention a method for automatically registering an appliance, including connecting a communication card to an electrical appliance, wherein identifying information about the electrical appliance and its purchase is stored within a memory in the electrical appliance, automatically collecting (i) the identifying information about the electrical appliance and its purchase from the memory in the electrical appliance, and (ii) owner information, by the communication card, automatically opening a TCP connection with a server computer, by the communication card, and automatically transmitting at least a portion of the collected information to the server computer, by the communication card.

BRIEF DESCRIPTION OF THE DRAWINGS

The present invention will be more fully understood and appreciated from the following detailed description, taken in conjunction with the drawings in which.

DETAILED DESCRIPTION

Figure 1:
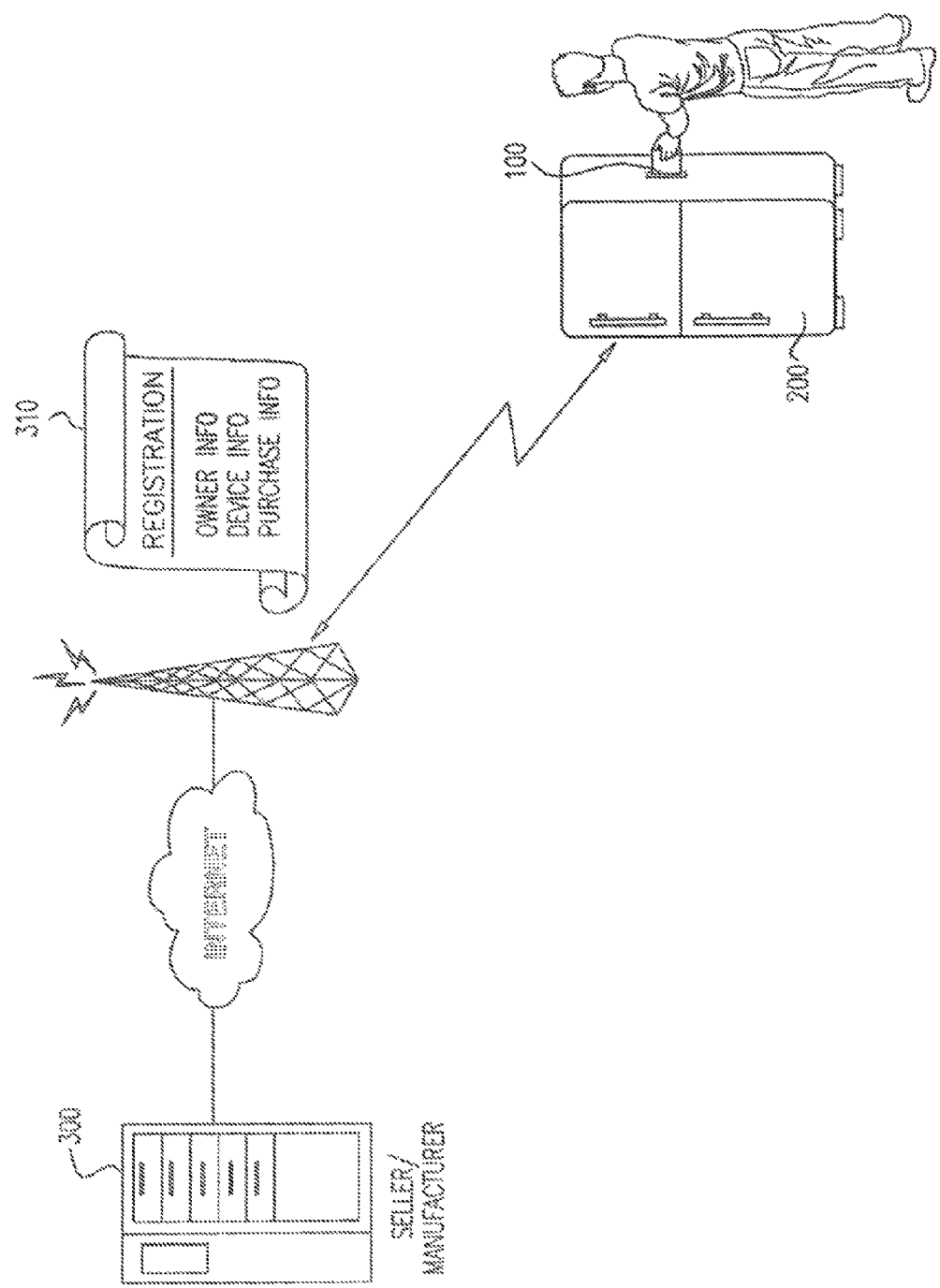
FIG. 1 is a simplified illustration of a communications network with a communication card that transmits information about an appliance to one or more of a remote manufacturer, a remote seller and a remote service provider, in accordance with an embodiment of the present invention.
Figure 2:
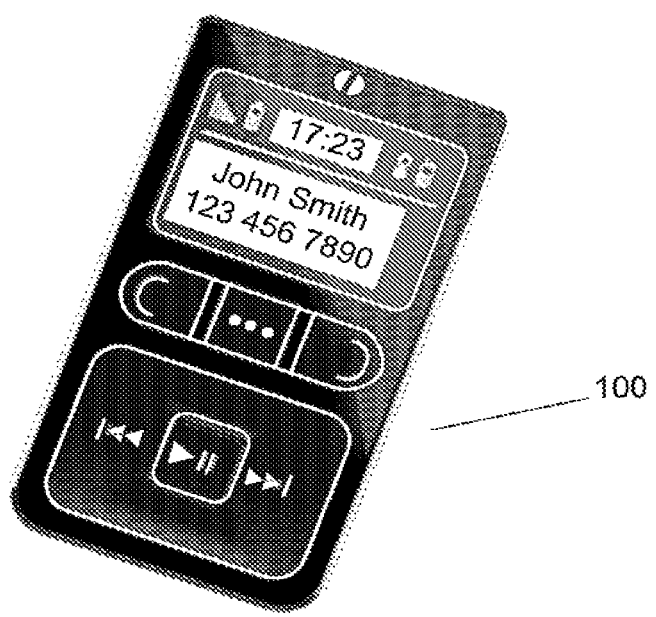
FIG. 2 is a picture of the physical communication card of FIG. 1, in accordance with an embodiment of the present invention.

Aspects of the present invention relate to a communication card that connects to an electrical appliance and automatically registers the appliance for its owner. Reference is now made to FIG. 1, which is a simplified illustration of a communications network with a communication card 100 that wirelessly transmits information about an appliance 200 to one or more of a remote manufacturer, a remote seller and a remote service provider 300, in accordance with an embodiment of the present invention. Reference is also made to FIG. 2, which is a picture of a physical communication card 100, in accordance with an embodiment of the present invention. When communication card 100 is connected to appliance 200, the communication card automatically registers the appliance by transmitting appropriate information 310 about the appliance, its purchase, and its owner to remote manufacturer or seller or service provider 300.

Figure 3:
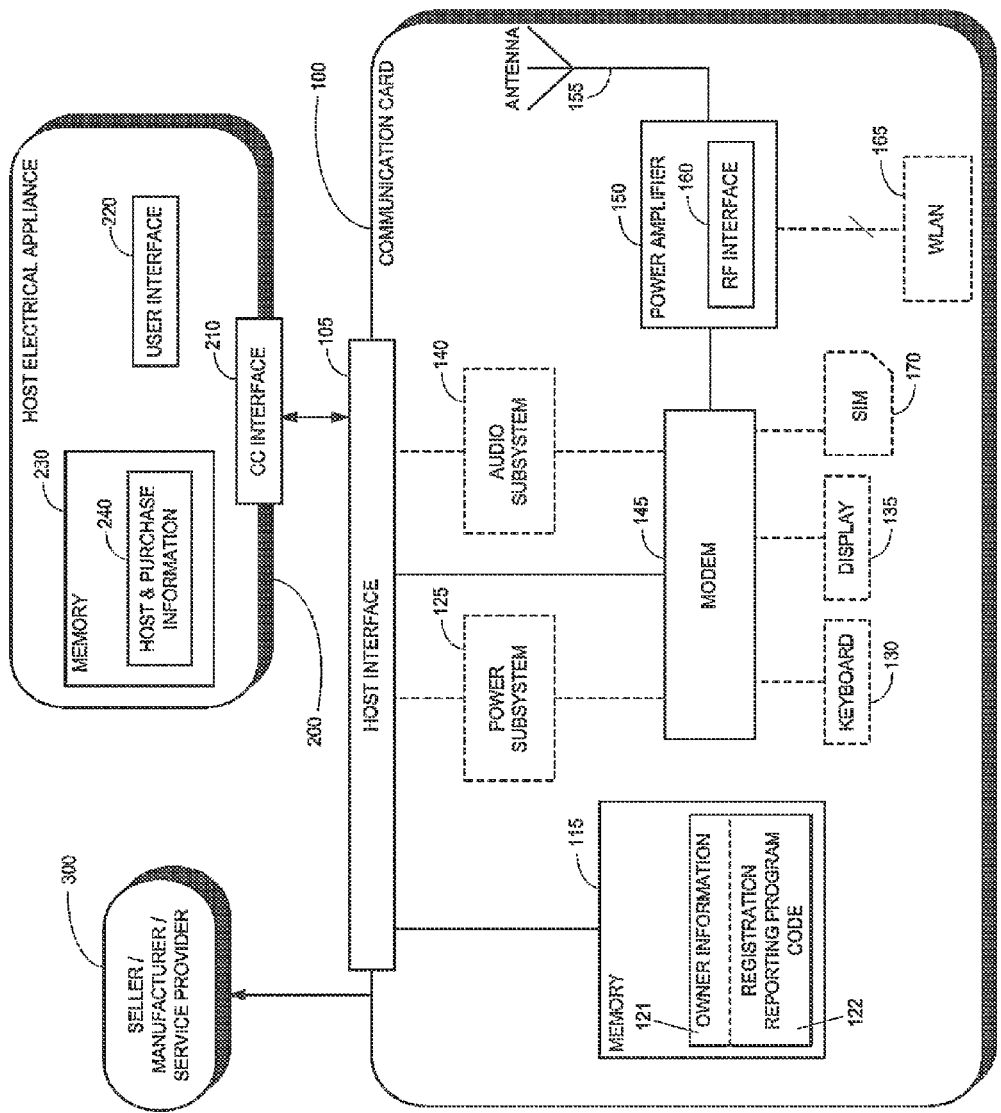
FIG. 3 is a simplified block diagram of a system for a communication card used for registration of electrical appliances, in accordance with an embodiment of the present invention.

Reference is now made to FIG. 3, which is a simplified block diagram of a system for a communication card 100 used for registration of electrical appliances, in accordance with an embodiment of the present invention. Shown in FIG. 3 is a communication card (CC) 100 and a host electrical appliance 200, which connect to one another using a host interface 105 and a CC interface 210. Host interface 105 and CC interface 210 may be a physical interface, such as a USB interface or an SD interface, or a BLUETOOTH® interface or such other wireless interface.

Main components of CC 100 include a controller (not shown), a flash storage memory 115, a wireless cellular modem 145, and a power amplifier 150. CC 100 optionally includes a power subsystem 125, an input device 130 such as a keypad, and an output display 135, an audio subsystem 140, and an optional subscriber identification module (SIM) 170.

In accordance with an embodiment of the present invention, memory 115 stores information 121 about the owner of CC 100. Owner information 121 includes sufficient information for registering the owner of electrical appliance 200. In an alternative embodiment of the present invention, information 121 is stored in SIM 170. Memory 115 also stores program code 122 for registering host appliance 200. Modem 145 sends and receives voice and digital data using wireless communication, via an antenna 155 or via an optional wireless LAN 165, or via both. Power amplifier 150 is used to amplify data transmitted by modem 145. Power amplifier 150 includes an RF interface 160.

In accordance with an embodiment of the present invention, when CC 100 includes the optional components shown in FIG. 3, then CC 100 functions both as a standalone modular cell phone, and also in cooperation with electrical appliance 200 as a device for automated appliance registration as described hereinbelow. In accordance with another embodiment of the present invention, when CC 100 does not include the optional components shown in FIG. 3, then CC functions only in cooperation with electrical appliance 200.

Electrical appliance 200 may be any of a wide variety of devices. Electrical appliance 200 may be an entertainment device, including inter alia a home entertainment center, a video game console such as the PLAYSTATION® manufactured by Sony Computer Entertainment Inc. of Tokyo, Japan, a multimedia player, a television, an audio system and a DVD player. Electrical appliance 200 may be a communication device, including inter alia a telephone, a fax machine and a cell phone. Electrical appliance 200 may be a piece of office equipment including inter alia an office computer, a printer and a scanner. Electrical appliance 200 may be a home appliance including inter alia a refrigerator, a microwave oven, a stove, a washing machine, a drying machine and an air conditioner. Electrical appliance 200 may be a consumer appliance including inter alia a personal computer, a personal data assistant (PDA), an automobile, a treadmill and a camera. Generally, electrical appliance 200 includes a user interface 220 for activating functions of appliance 200, and a storage memory 230 for recording information 240 about the electrical appliance and its purchase. Host & purchase information 240 includes sufficient information for registering electrical appliance 200. Such details may include inter alia a serial number for appliance 200, a model number, a date of purchase and an identifier for the store where appliance 200 was purchased.

CC 100 is used to send registration information about electrical appliance 200 and its owner to one or more of seller, manufacturer or service provider 300.

When CC 100 is connected to appliance 200, appliance 200 serves as a host device. To register appliance 200, registration program code 122 programs CC 100 (i) to collect requisite host & purchase information 240 from host memory 230, and owner information 121 from CC memory 115 or from SIM 170; and (ii) to forward the collected information to the seller, manufacturer or service provider 300 for appliance 200, as appropriate, using modem 145. Contact information for seller, manufacturer or service provider 300 may be available in host memory 230. Alternatively, seller, manufacturer or service provider 300 contact information may be entered manually to CC 100. Yet alternatively, seller, manufacturer or service provider 300 contact information may be available in CC memory 115. Specifically, CC 100 may store a list of manufacturers and their appliances, and looks up the appropriate contact information based on appliance 200.

In an alternative embodiment of the present invention, owner information 121 does not reside in CC memory 115 or in SIM 170. Instead, CC 100 obtains the owner information from an external server.

In accordance with one embodiment of the present invention, connection to seller, manufacturer or service provider 300 is initiated by CC 100, and transmitted over GPRS (GSM mobile data service). CC 100 creates a file or text message that includes the relevant registration data, shown as message 310 in FIG. 1. An example of such file or text message is as follows.

Device details

Type: Audio Receiver
Brand: Yamaha
Model: RX-V2700
S/N: 12345-ABCDE
Purchase Details Date of Purchase: Jan. 01, 2007
Store: 1280 Lexington Ave., New York, NY 10028
Owner Details Name: John Smith
Phone: 123-456-7890
Cell: 098-765-4321
Email: John.Smith@anonymous.com In another embodiment of the present invention, CC 100 transmits the registration information via an SMS or MMS message. In yet another embodiment of the present invention, CC 100 places a voice call to seller, manufacturer or service provider 300 with the registration information, using text-to-speech conversion.

In yet another embodiment of the present invention, CC 100 uses dial-tone modulation frequency (DTMF), thereby obviating the need for text-to-speech conversion. DTMF signals include the digits 0, 1, . . . , 9, the symbols '*' and '#', and possibly the characters A, B, C, D. Using these signals CC 100 encodes and transmits the registration information to seller, manufacturer or service provider 300 over a regular voice call, and seller, manufacturer or service provider 300 decodes the signals to obtain the registration information.

In a different embodiment of the present invention, owner information 121 is not stored in CC 100. Instead, owner information is retrieved by the seller, manufacturer and service provider 300 after receipt of registration data sent from CC 100. Alternatively or additionally, owner information, together with an optional owner log history, is stored within appliance 200 itself.

After CC 100 has registered appliance 200, a corresponding flag is set in CC memory 115 or host memory 230. Thereafter, when CC 100 is connected to appliance 200 it knows not to register appliance 200 a second time.

In accordance with an embodiment of the present invention, CC 100 maintains a history log of appliances that it has registered.

Figure 4:
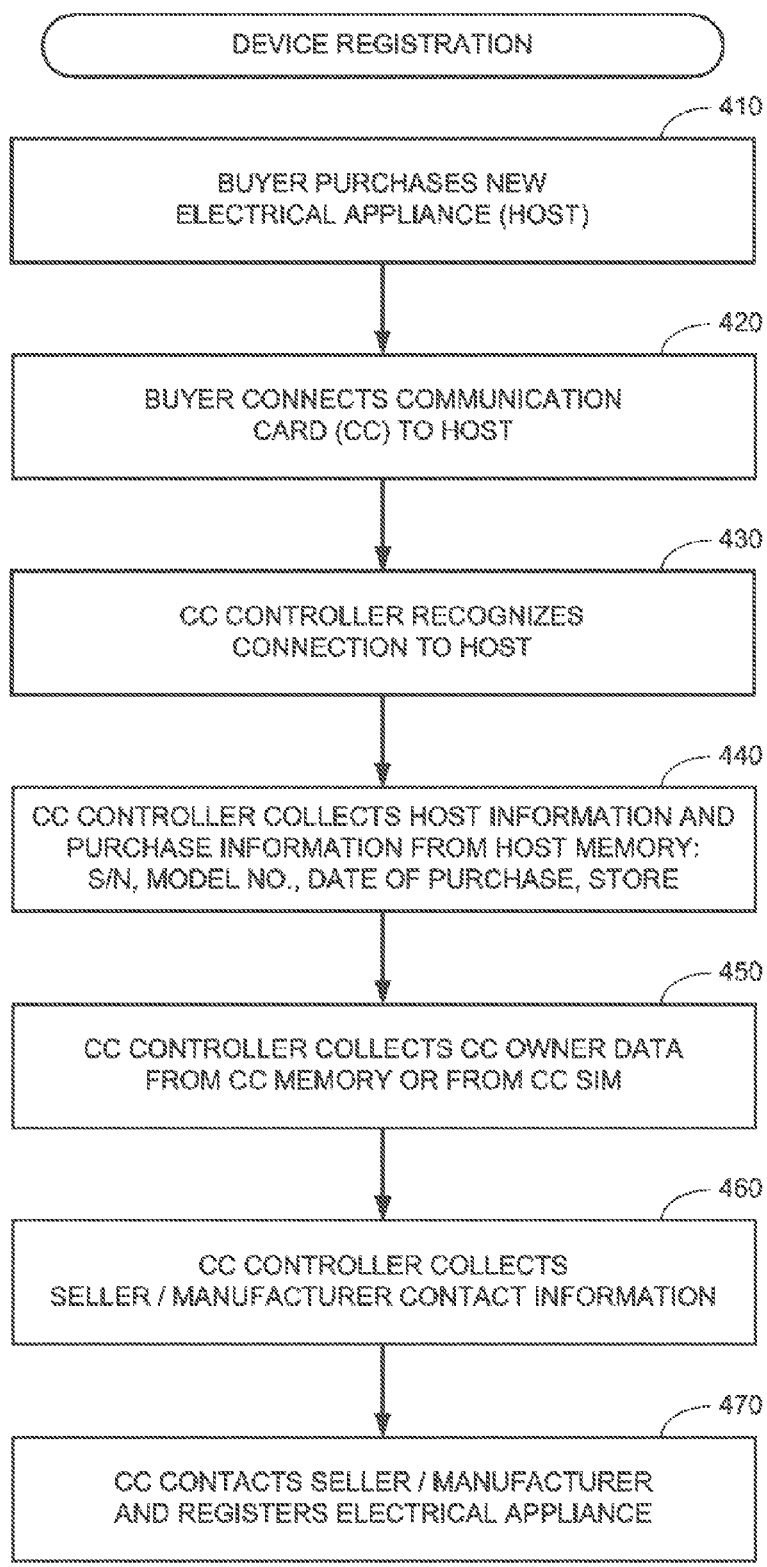
FIG. 4 is a simplified flowchart of a method for registering electrical appliances using a communication card, in accordance with an embodiment of the present invention.

Reference is now made to FIG. 4, which is a simplified flowchart of a method for registering electrical appliances using a communication card, in accordance with an embodiment of the present invention. At step 410 a buyer purchases an electrical appliance, which serves as a host device, such as appliance 200 of FIG. 3. At step 420 the buyer connects a communication card, such as CC 100, to the host appliance. At step 430 the CC card controller recognizes its connection to the host.

At step 440 the CC controller, under program instruction from code stored on CC 100, such as program code 122, collects host information and purchase information from a storage memory in the host. Such host and purchase information includes inter alis a serial number, a model number, a date of purchase, and an identifier of a store where the appliance was purchased. At step 450 the CC controller collects information about the owner from storage memory in the CC or from a SIM in the CC. At step 460 the CC controller collects contact information for the seller, manufacturer or service provider of the appliance, with whom the appliance is to be registered. Such contact information may be stored in the host, or may be manually entered. Finally, at step 470 the CC opens a connection to the seller, manufacturer or service provider, and transmits the registration information. The CC may transmit the registration information as data transmitted over GPRS. Alternatively, the CC may transmit the information as a voice transmission by making a phone call to the seller or manufacturer.

In alternative embodiments of the present invention, if the owner is already a subscriber to a service provider, the owner's information is already available. The CC only needs to provide an ID for the owner. For example, the owner's CC may already be registered with a service provider. As such, when the CC transmits data, the CC can be identified, say, from a phone number or from another identifier assigned thereto. The CC thus need only transmit host information to a service provider, and the service provider can determine the owner information from the CC phone number or from another identifier of the CC.

Figure 5:
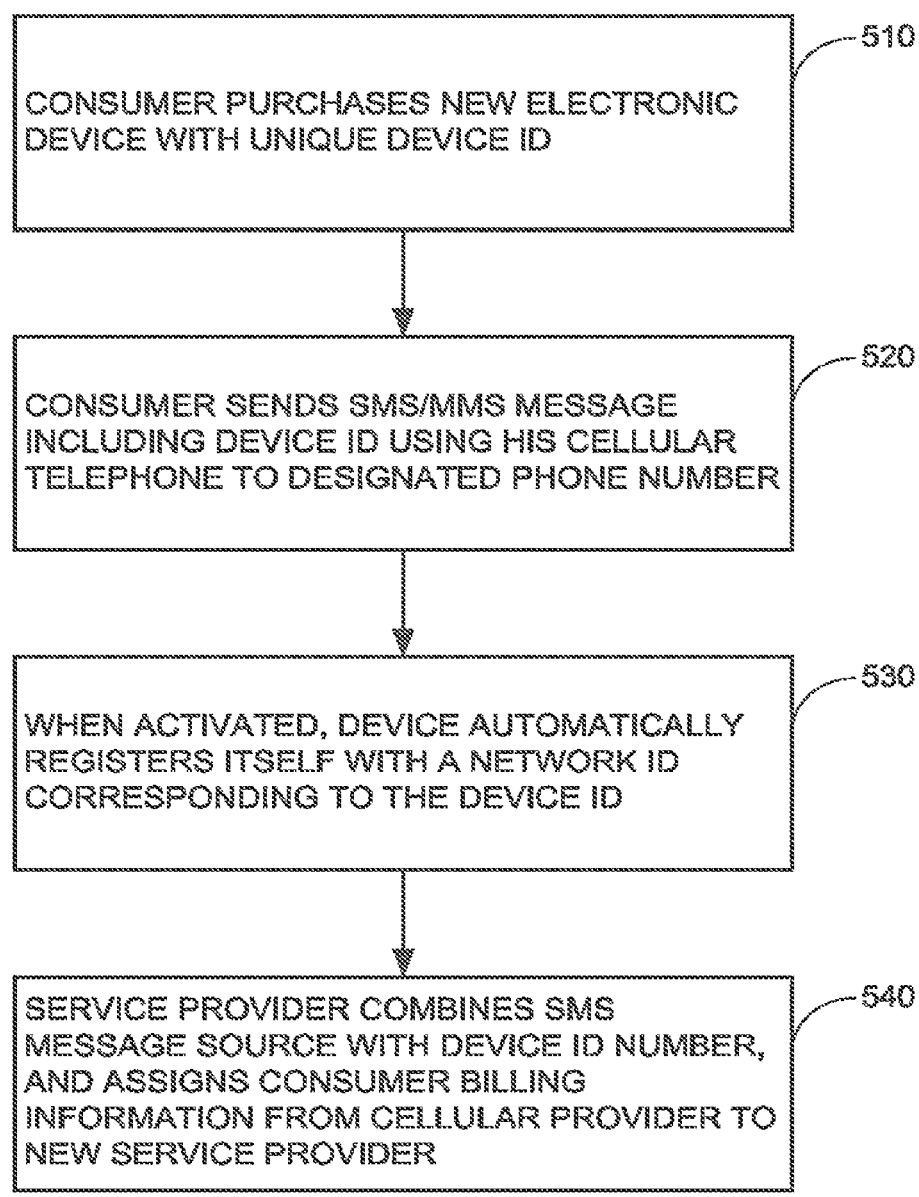
FIG. 5 is a simplified flowchart of a method for registering an appliance with a service provider, in accordance with a first alternative embodiment of the present invention.
Figure 6:
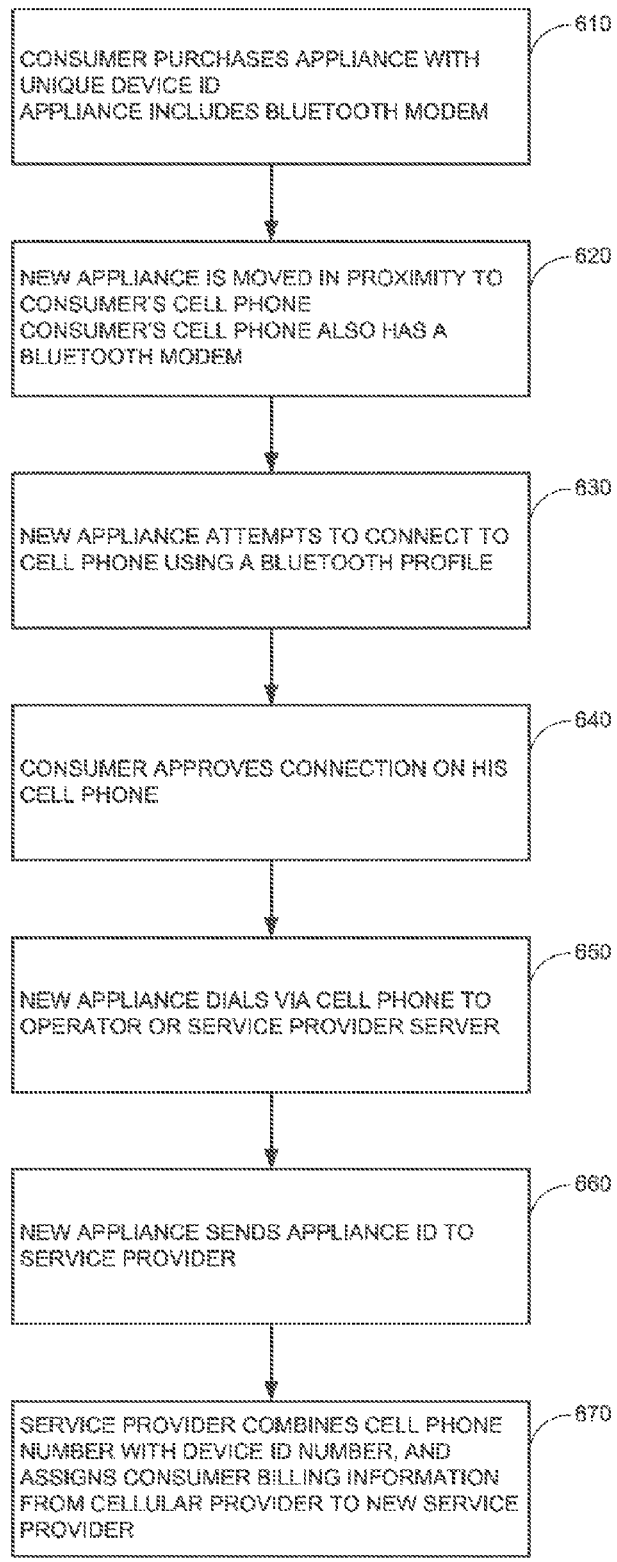
FIG. 6 is a simplified flowchart of a method for registering an appliance with a service provider, in accordance with a second alternative embodiment of the present invention.
Figure 7:
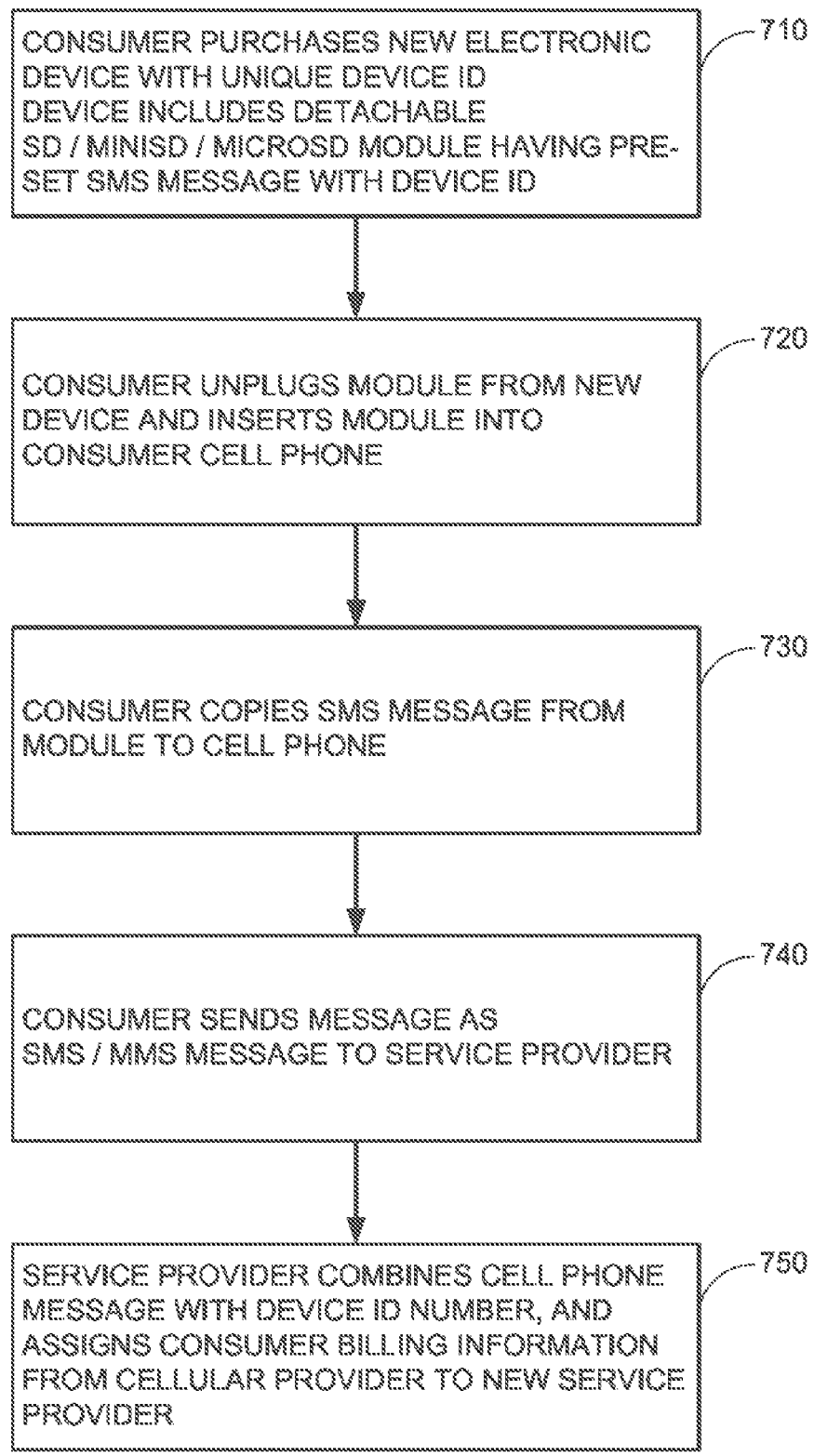
FIG. 7, which is a simplified flowchart of a method for registering an electronic device with a service provider, in accordance with a third alternative embodiment of the present invention.

In this regard, reference is now made to FIGS. 5, 6 and 7, which illustrate three such alternative embodiments. FIG. 5 is a simplified flowchart of a method for registering an appliance with a service provider, in accordance with a first alternative embodiment of the present invention. At step 510, a consumer purchases a new appliance having a unique ID associated therewith. In order to use the new appliance, the consumer must register it by subscribing to an appropriate service provider.

At step 520 the consumer sends an SMS or MMS message to a designated phone number, the message including the unique ID for his new appliance. The designated phone number generally corresponds to a service provider operator or server computer.

The new appliance may have its own embedded modem. If so, then at step 530 the appliance, when activated, registers itself over a communication network to a server computer. The appliance uses a network ID that corresponds to the ID of the appliance. Otherwise, if the appliance does not have an embedded modem, the appliance may use a CC to perform the registration.

After steps 520 and 530, the service provider has received (i) the consumer's cellular telephone number, as the source of the SMS message, and (ii) the appliance ID number. At step 540 the service provider associates the billing information associated with the consumer's cellular telephone number with the new appliance, thereby registering the consumer's new appliance with the service provider.

Reference is now made to FIG. 6, which is a simplified flowchart of a method for registering an appliance with a service provider, in accordance with a second alternative embodiment of the present invention. At step 610 a consumer purchases a new appliance having a unique ID associate therewith. The appliance includes a BLUETOOTH® modem. In addition, for this embodiment the consumer's cellular telephone also includes a BLUETOOTH® modem.

At step 620 the new appliance and the consumer's cellular telephone are brought into close proximity, within the range of BLUETOOTH® communication. At step 630 the new appliance attempts to initiate communication with the consumer's cellular telephone via BLUETOOTH®. Generally, when such communication is initiated, the consumer's cellular telephone indicates that a connection is being requested. At step 640 the consumer approves the requested connection on his cellular telephone. At step 650 the new appliance, having communication with the cellular telephone, is operative to dial the cellular telephone to a service provider operator or computer server. The service provider is able to recognize the source of the phone call; i.e., the consumer's cellular telephone number.

If the new appliance has an embedded modem, then at step 660 the new appliance sends its device ID to the service provider. Otherwise, if the new appliance does not have an embedded modem then a CC is used to send the appliance device ID to the service provider. At this stage, the service provider has received (i) the consumer's cellular telephone number, and (ii) the ID of the consumer's new appliance. At step 670 the service provider associates the billing information associated with the consumer's cellular telephone number with the new appliance, thereby registering the consumer's new appliance with the service provider.

Reference is now made to FIG. 7, which is a simplified flowchart of a method for registering an electronic device with a service provider, in accordance with a third alternative embodiment of the present invention. At step 710 a consumer purchases a new appliance having a unique ID associated therewith. The new appliance includes a detachable memory module, such as an SD, miniSD or microSD form factor memory module, and the module has stored within it a pre-stored SMS message including the device ID.

At step 720 the consumer unplugs the module from his new appliance and plugs it into his cellular telephone. At step 730 the consumer copies the pre-stored SMS message from the module to his cellular telephone. At step 740 the consumer sends the SMS message to a service provider operator or server computer. The service provider thus receives (i) the consumer's cellular telephone number; namely, the source of the SMS message, and (ii) the consumer's new appliance ID.

At step 750 the service provider assigns the billing information associated with the consumer's cellular telephone number with the new appliance, thereby registering the new appliance.

Embodiments of the present invention are of advantage for registering change of ownership of an appliance. For example, appliance 200 may be an automobile, and CC 100 may be used to register a sale of the automobile from a previous owner to a new owner.

In one embodiment of the present invention, change of ownership is registered by a two-step process whereby (i) the previous owner uses CC 100 to relinquish his ownership of appliance 200, and (ii) the new owner uses CC 100 to register his new ownership of appliance 200. Moreover, appliance 200 stores the terms of the original warranty for appliance 200, in order that the new owner can determine the terms of the warranty, and how much time remains for the warranty.

Figure 8:
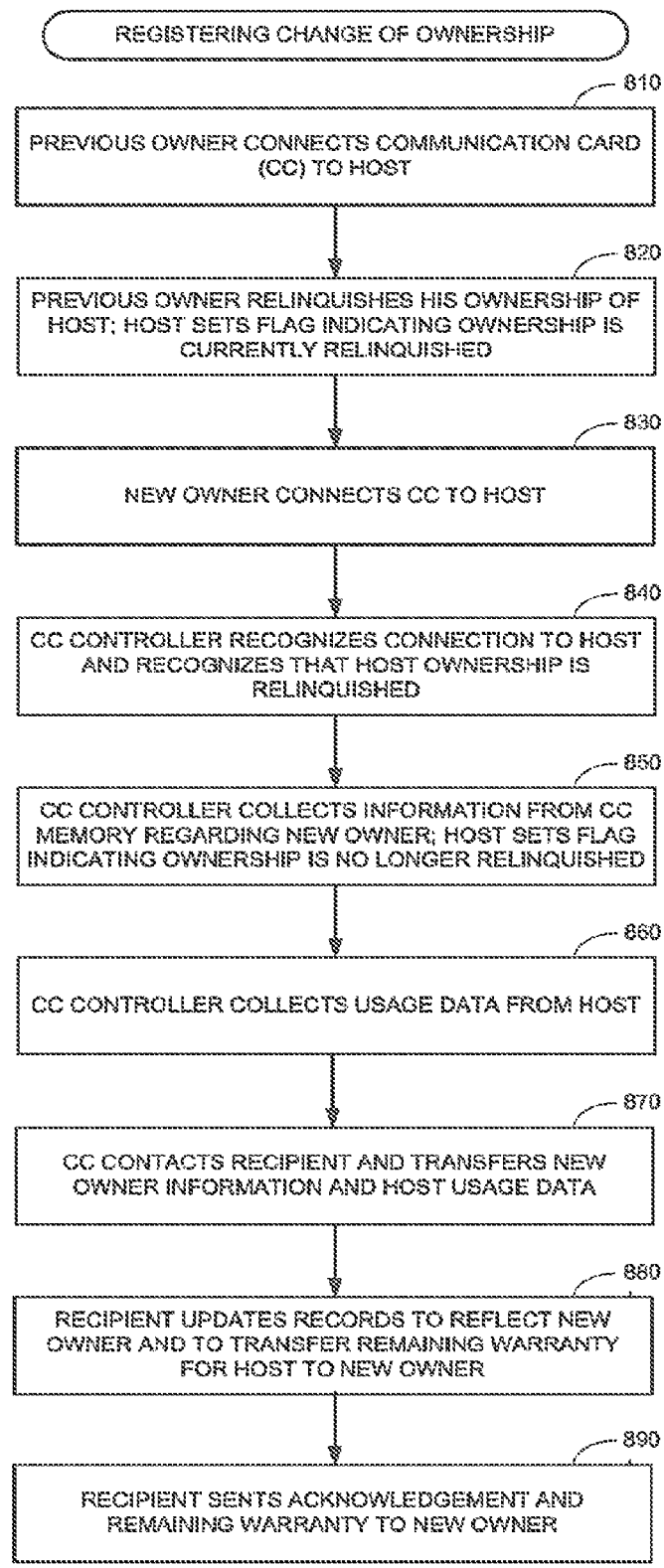
FIG. 8 is a simplified flowchart of a method for registering change of ownership of an appliance, in accordance with an embodiment of the present invention.

In this regard, reference is now made to FIG. 8, which is a simplified flowchart of a method for registering change of ownership of an appliance, in accordance with an embodiment of the present invention. The flowchart of FIG. 8 refers to a previous owner who has transferred ownership of host appliance 200 to a new owner. In the embodiment of the present invention shown in FIG. 8, each owner has his own CC 100.

At step 810 the previous owners connects his communication card to the host appliance. At step 820 the previous owner relinquishes his ownership of the host, thereby also relinquishing his rights to any applicable warranties. The host sets an ownership flag to indicate that its ownership is currently relinquished; i.e., there is currently no owner.

At step 830 the new owner connects his communication card to the host appliance. In the embodiment showed in FIG. 8, the new owner's communication card has stored therein information about the new owner including inter alia the new owner's contact information. At step 840 the CC controller recognizes that a CC is connected to the host, and that the ownership of the host is currently relinquished. At step 850 the CC controller collects the new owner information from the new owner's CC, and resets the ownership flag to indicate that is ownership is no longer relinquished.

At step 860 the CC controller collects usage data from the host. In general, usage data relates to cumulative usage of the host. E.g., if the host is an automobile, then its usage data may include the current mileage on the automobile; if the host is a copier machine, then its usage data may include the number of copies made to date by the copier machine. The usage data is generally relevant in determining the remaining warranty on the host. E.g., an automobile may have a warranty for the first three years or the first 50,000 miles, whichever occurs first; a copier machine may have a warranty for two years or up to 25,000 copies, whichever occurs first.

At step 870 the CC contacts a recipient, such as a seller, manufacturer or service provider of the host, and transmits the new owner information and host usage data. At step 880 the recipient updates its records to reflect the new owner, updates any applicable warranties, based on the host usage data, to reflect the remaining lifetime of the warranties, and transfers the updated warranties to the new owner. At step 890 the recipient sends an acknowledgement to the new owner acknowledging his ownership and acknowledging his remaining warranties as appropriate.

It will be appreciated by those skilled in the art that the method of FIG. 8 requires cooperation between the previous owner and the new owner. Moreover the method is fool-proof in that if an owner of the host mistakenly relinquishes his ownership at step 820, then he may reclaim ownership by re-connecting his CC to the appliance at step 830.

In another embodiment of the present invention, instead of or in addition to generating reports, CC 100 sends registration information it collects to a server computer. In this regard, reference is now made to FIG. 9, which is a simplified block diagram of a web-based device registration system, in accordance with an embodiment of the present invention.

A server computer 900 includes a database with serial numbers, or such other identifiers of electrical appliances 200, and information about their corresponding manufacturers, sellers or service providers 300. When CC 100 is connected to electrical appliance 200, CC 100 opens a TCP connection and generates an HTTP request to computer server 900, the request including inter alia the serial number of appliance 200, and contact information, such as a telephone number, for the owner. An example of such an HTTP call is: http://www.myserver.com/action.aspx?action=registration&serial=89723464&phone=+15551212. Server information for computer server 900, including inter alia a server URL, which may be a server IP address, a server domain name, or such other locator, is generally stored in CC 100.

Figure 9:
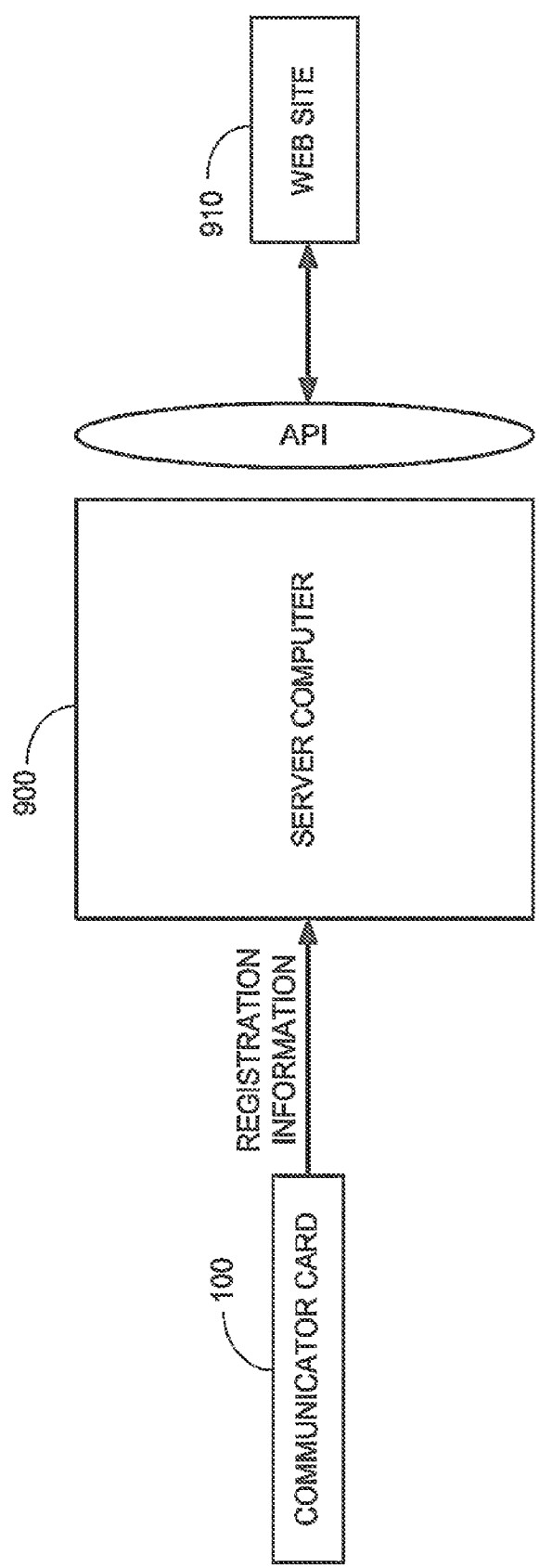
FIG. 9 is a simplified block diagram of a web-based device registration system, in accordance with an embodiment of the present invention.

Also shown in FIG. 9 is an application programming interface (API). After receiving the HTTP request with the serial number of appliance 200, server computer 900 locates the relevant information about manufacturer, seller or service provider 300 for the serial number, and transmits a registration report for appliance 200 to manufacturer, seller and service provider 300, via the API. In this way, manufacturers, sellers and service providers 300 receive registration reports for the appliances 200 that they are responsible for. This embodiment is described as "push" mode, since server computer 900 pushes the registration reports to manufacturers, sellers and service providers 300.

In accordance with a "pull" mode embodiment of the present invention, manufacturer, seller or service provider 300 uses the API to access server computer 900 and extract registration reports for the appliances 200 that they are responsible for from a website 910. In this embodiment, manufacturers, sellers or service providers 300 pull their registration reports from web site 910.

Use of server computer 900 is of particular advantage when manufacturer, seller or service provider 300 changes its contact information. The change is recorded once in server computer 900, and does not need to be changed in appliances 200.

Additionally, server computer 900 may vary the format of messages sent to manufacturer, seller or service provider 300, so that registration reports are transmitted via SMS, MMS, phone call, e-mail, HTTP request, or such other transmission format.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for registering an appliance with a service provider, comprising:

initiating a short range radio connection between a short range radio modem of an appliance and a short range radio modem of a cellular telephone, in response to the cellular telephone being brought in proximity of the appliance, wherein the appliance comprises a cellular modem and a short range radio modem, wherein the cellular telephone comprises a cellular modem and a short range radio modem, wherein the cellular telephone is separate from the appliance, wherein a server computer stores billing information associated with the cellular telephone, and wherein the server computer is separate from the appliance and separate from the cellular telephone;

approving the initiated short range radio connection, by the cellular telephone;

dialing, by the appliance via the initiated short range radio connection, the cellular telephone to communicate with the server computer via the cellular modem of the cellular telephone;

receiving, by the server computer, registration information from the appliance via the cellular modem of the appliance; and associating, by the server computer, the billing information associated with the cellular telephone, with the appliance.

2. The method of claim 1 wherein the short range radio modem of the appliance and the short range radio modem of the cellular telephone are BLUETOOTH® modems.

3. The method of claim 1 wherein the appliance has a unique ID, and wherein the registration information comprises the appliance ID.

4. The method of claim 1 wherein the registration information comprises a serial number and a model number.

5. The method of claim 1 wherein the registration information comprises an identifier for a point of purchase from which the appliance was purchased, and a date on which the appliance was purchased.

* * * * *